United States Patent [19]

Kowalski

[11] Patent Number: 6,152,367
[45] Date of Patent: Nov. 28, 2000

[54] WIRED LOGIC MICROCIRCUIT AND AUTHENTICATION METHOD HAVING PROTECTION AGAINST FRAUDULENT DETECTION OF A USER SECRET CODE DURING AUTHENTICATION

[75] Inventor: Jacek Kowalski, Les Jardins des, France

[73] Assignee: Inside Technologies, Saint Clement les Places, France

[21] Appl. No.: 09/043,762

[22] PCT Filed: Oct. 1, 1996

[86] PCT No.: PCT/FR96/01524

§ 371 Date: Mar. 26, 1998

§ 102(e) Date: Mar. 26, 1998

[87] PCT Pub. No.: WO97/14119

PCT Pub. Date: Apr. 17, 1997

[30] Foreign Application Priority Data

Oct. 9, 1995 [FR] France .................................. 95 12178

[51] Int. Cl.[7] .................................................. G06K 5/00
[52] U.S. Cl. ........................................... 235/382; 235/380
[58] Field of Search .................................... 235/382, 380, 235/375, 379

[56] References Cited

U.S. PATENT DOCUMENTS

| | | | |
|---|---|---|---|
| 4,295,039 | 10/1981 | Stuckert | 235/380 |
| 4,710,613 | 12/1987 | Shigenaga | 235/380 |
| 4,802,218 | 1/1989 | Wright et al. | 380/23 |
| 4,827,450 | 5/1989 | Kowalski | 365/185 |
| 4,864,618 | 9/1989 | Wright et al. | 380/51 |
| 4,868,489 | 9/1989 | Kowalski | 324/61 P |
| 4,881,199 | 11/1989 | Kowalski | 365/189.01 |
| 4,900,903 | 2/1990 | Wright et al. | 235/308 |
| 4,900,904 | 2/1990 | Wright et al. | 235/381 |
| 4,916,333 | 4/1990 | Kowalski | 307/296.5 |
| 5,022,001 | 6/1991 | Kowalski et al. | 365/185 |
| 5,060,198 | 10/1991 | Kowalski | 365/201 |
| 5,060,261 | 10/1991 | Avenier et al. | 380/3 |

(List continued on next page.)

FOREIGN PATENT DOCUMENTS

| | | |
|---|---|---|
| 0 028 965 | 5/1981 | European Pat. Off. . |
| 0 029 894 | 6/1981 | European Pat. Off. . |
| 0 427 465 | 5/1991 | European Pat. Off. . |
| 2650097 | 1/1991 | France . |
| 2698195 | 5/1994 | France . |
| 2144564 | 3/1985 | United Kingdom . |
| WO 92/06451 | 4/1992 | WIPO . |
| WO 92/15074 | 9/1992 | WIPO . |
| WO 92/15096 | 9/1992 | WIPO . |
| WO 94/11829 | 5/1994 | WIPO . |

*Primary Examiner*—Donald Hajec
*Assistant Examiner*—Jared J. Fureman
*Attorney, Agent, or Firm*—Nilles & Nilles SC

[57] ABSTRACT

An authentication method for a wired-logic microcircuit mounted on a support and a microcircuit reading terminal. The microcircuit is provided with a memory which has data readable by the terminal. A secret code of the microcircuit is arranged in a region of the memory that is not readable by the terminal. The microcircuit generates an authentication code from the data in the memory that is readable by the terminal, the secret code and a random code. The terminal generates an authentication code from the data in the microcircuit memory that is readable by the terminal, a secret code provided to the terminal by a microcircuit user and random code, and the authentication code generated by the microcircuit is compared with the authentication code generated by the terminal.

21 Claims, 2 Drawing Sheets

U.S. PATENT DOCUMENTS

| | | | |
|---|---|---|---|
| 5,097,146 | 3/1992 | Kowalski et al. | 307/350 |
| 5,120,939 | 6/1992 | Claus et al. | 235/382 |
| 5,191,498 | 3/1993 | Kowalski | 361/1 |
| 5,291,434 | 3/1994 | Kowalski | 365/96 |
| 5,327,018 | 7/1994 | Karlish et al. | 307/244 |
| 5,381,452 | 1/1995 | Kowalski | 377/26 |
| 5,394,359 | 2/1995 | Kowalski | 365/185 |
| 5,420,412 | 5/1995 | Kowalski | 235/492 |
| 5,442,589 | 8/1995 | Kowalski | 365/225.7 |
| 5,444,412 | 8/1995 | Kowalski | 327/541 |
| 5,448,187 | 9/1995 | Kowalski | 326/81 |
| 5,473,564 | 12/1995 | Kowalski | 365/185.1 |
| 5,512,852 | 4/1996 | Kowalski | 327/206 |
| 5,534,686 | 7/1996 | Kowalski et al. | 235/492 |
| 5,550,919 | 8/1996 | Kowalski | 380/23 |
| 5,552,621 | 9/1996 | Kowalski | 257/321 |
| 5,576,989 | 11/1996 | Kowalski | 365/185.09 |
| 5,577,121 | 11/1996 | Davis et al. | 380/24 |
| 5,657,388 | 8/1997 | Weiss | 380/23 |
| 5,721,440 | 2/1998 | Kowalski | 257/300 |
| 5,740,403 | 4/1998 | Kowalski | 395/491 |
| 5,892,211 | 4/1999 | Davis et al. | 235/380 |

WIRED LOGIC MICROCIRCUIT AND AUTHENTICATION METHOD HAVING PROTECTION AGAINST FRAUDULENT DETECTION OF A USER SECRET CODE DURING AUTHENTICATION

BACKGROUND OF THE INVENTION

The present invention relates to an authentication method suitable for a wired-logic circuit mounted on a portable support and to a terminal for reading the microcircuit.

The present invention relates in particular to the field of smart cards, and more particularly to wired-logic microcircuits which are used in smart cards.

Under the generic term of "chip cards", two principal categories of cards are indeed meant, whose technology is different: on one hand, the microprocessor cards, and, on the other hand, the cards called "smart cards". Unlike microprocessor cards, smart cards are only provided with a wired-logic microcircuit, which offers much fewer possibilities in terms of facility of use, data processing ability, programming, and in particular in terms of security and fraud protection than a microprocessor microcircuit.

In compensation, wired-logic microcircuits have the advantage of a very low cost price, so that smart cards have had an important development last years for applications where a high level of security was not necessary. Thus the use of pre-payment cards like telephone cards has been generalised. New applications such as electronic purses or electronic keys (in particular in the field of cars) are, at present, being considered for use on a large scale.

It is however necessary that wired-logic microcircuits should provide a much greater security level in the future than at present for the development of these numerous future applications and, as regards security in use, that they should be able to compete with microprocessor circuits which are provided with improved software security mechanisms.

Therefore, a general purpose of the present invention is to improve the protection mechanisms of wired-logic microcircuits, keeping in mind that manufacturing costs rise very quickly when sophisticated security functions are to be performed.

As a reminder, FIG. 1 shows the structure and the working of a microcircuit 1 of a conventional smart card. The wired-logic microcircuit 1 mainly comprises a serial memory 2 (i.e. a bit by bit accessible memory), an authentication circuit 3 and a sequential logic circuit 4 which controls the functioning of the various elements by means of a clock signal H which is provided by a terminal 10 into which the card is inserted. The memory 2 contains various data stored in bit form, such as a serial number of the card NI (or identification number of the microcircuit) and transaction data DA representing for example the monetary value of the card or a number of telephone pulses. The authentication circuit 3 has a serial input 3-1 for receiving an input code CE and a serial output 3-2 for producing an authentication code CA. Furthermore, the microcircuit 1 is provided with contact pins for the electrical interface with the terminal 10, i.e. an input-output contact pin I/O for the digital data communication, a contact pin RST for initialising the microcircuit, a contact pin H for the input of the clock signal and two contact pins Vcc and GND for power supply. The output of the memory 2 as well as the input 3-1 and the output 3-2 of the authentication circuit are coupled to the input-output contact pin I/O. The digital data circulate in a serial form, that is bit by bit in synchronism with the clock signal, which allows a simplification of the internal structure of the circuit, as the connections between the various elements are limited to one wire only.

When the card is inserted into the terminal 10, the terminal 10 has to determine, for security reasons, if the card is authentic or fraudulent. The authentication circuit 3 thus takes Fart into a verification procedure as hereunder described for verifying the authenticity of the card. It is first recalled that the terminal 10, which is generally provided with a microprocessor 11 controlled by a programmed memory 12, knows the secrets of the security mechanisms introduced into the card.

Step 1—The terminal 10 generates a random binary code ALEXT and applies it as an input code CE to the authentication circuit 3. The circuit 3 transforms the code ALEXT into an authentication code CA which can be written $$CA = F_{Ks}(ALEXT)$$

$F_{Ks}$ representing the transform function, or authentication function, performed by the circuit 3 from a secret key Ks which is at its disposal.

Step 2—In parallel with step 1, the terminal 10, which knows the secret key Ks and the authentication function $F_{Ks}$ (stored as software in the programmed memory 12) for its part calculates a code CA' such as $$CA' = F_{Ks}(ALEXT)$$

Step 3—The terminal 10 compares the code CA produced by the card and the code CA' calculated by itself. If the two codes are different, the card is not authentic and must be refused by the terminal.

In a known alternative of this method, the terminal 10 does not know the secret key Ks, but determines it from the serial number NI and by means of another secret key Kp at its disposal and a transform function $F_{Kp}$ such as $$Ks = F_{Kp}(NI)$$

In this case, step 1 is preceded by a preliminary step wherein the terminal 10 reads the serial number NI out of the memory 2 and uses it to deduce Ks.

Finally, it appears that the protection mechanism against fraud relies entirely upon the authentication function $F_{Ks}$ which must not be able to be decoded by a fraudulent person.

A drawback of the authentication method which has just been described is that the card can be "interrogated" at will by a fraudulent person, who can introduce a lot of random codes ALEXT into it, observe the authentication codes CA returned by the authentication circuit 3 and try to decode the authentication function $F_{Ks}$ or discover its secret Ks by cross-checking.

OBJECT AND SUMMARY OF THE INVENTION

Therefore an object of the present invention is to avoid a smart card to be interrogated repetitively by a non authorised person trying to discover its secret.

Besides the card authentication, a second usual security mechanism is the verification of the legitimacy of the card holder. This procedure, which has the purpose of protecting cards against theft, relies upon the preliminary introduction of a secret code CS' by the user into the terminal. As illustrated in dotted line in FIG. 1, the already described microcircuit 1 is provided with a verification circuit 5 for receiving the secret code CS' (in digital form) from the terminal, which has itself received it from the user. The circuit 5 is for example a serial logic comparator provided with the secret code CS. If the code CS' sent by the terminal, such as it has been transferred to it by the user, corresponds to the code CS written into the circuit 5, the output of the circuit 5 produces a bit with a predefined value, for example a "1", at the contact pin I/O, and the terminal knows that he can start the transaction. Inversely, if the produced bit is a "0", the terminal indicates to the user that the code CS' is wrong.

This authentication technique of the user by means of a wired-logic circuit has the drawback to be complex and costly to be implemented. Another drawback of this conventional method is that the secret code circulates clearly on the card/terminal communication line amid an electronic "spying" of this line would certainly allow to find out the secret code.

Therefore, another object of the present invention is to provide a solution allowing the verification of the secret code CS' in a cheaper way and with better security conditions.

This object is achieved by an authentication method suitable for a wired-logic microcircuit mounted on a portable support and a terminal intended to read the microcircuit, the microcircuit being provided with a memory comprising data readable by the terminal, the terminal and the microcircuit comprising authentication means to produce an authentication code from an input code, the authentication means of the microcircuit comprising a wired-logic microcircuit with serial input and output, method wherein a secret code of the microcircuit is located in a memory area non readable by the terminal and comprising the following steps: production of an authentication code by the microcircuit comprising the step consisting in applying to the input of the authentication circuit the following linked data: the memory data which are readable by the terminal, the secret code and a random code; production by the terminal of an authentication code from an input code comprising: the microcircuit memory data which are readable by the terminal, a secret code transferred to the terminal by a user of the microcircuit and the random code; comparison of the authentication code produced by the microcircuit and the authentication code produced by the terminal.

According to one embodiment, the random code is generated by the terminal.

According to one embodiment, the random code is generated by the microcircuit.

The method of the invention can be used for the conventional authentication of the microcircuit by the terminal. In this case, the comparison of the two codes is performed by the terminal.

Another object of the present invention is achieved when the comparison of the authentication code produced by the microcircuit and the authentication code produced by the terminal is performed by the microcircuit.

In this case, when the authentication code produced by the microcircuit and the authentication code produced by the terminal are different, it can be provided to prevent the digital data transmission between the output of the authentication means of the microcircuit and the terminal.

According to one embodiment, the secret code is located in a memory area which is rendered able to be written into by the terminal after that the validity of the secret code of the user has been checked.

The present invention also relates to a wired-logic microcircuit mounted on a portable support, comprising an authentication circuit with serial input and output, arranged to produce an authentication code from an input code, a memory comprising data readable by a terminal, said microcircuit further comprising a microcircuit secret code located in an area of the memory which is not readable by the terminal, means for generating a random code, means for applying in linked form, to the authentication circuit, the random code and the data of the memory, the secret code being included, to produce an internal authentication code, means for comparing the internal authentication code with an external authentication code sent by a terminal and means for blocking at least partially the internal functioning of the microcircuit if the external authentication code is different from the internal authentication code.

According to one embodiment, the blocking means are arranged for prohibiting the digital data transmission from the output of the authentication circuit to the outside of the microcircuit.

Advantageously, the blocking means comprise a logic gate receiving the output of a comparator circuit at its first input and the output of the authentication circuit at its second input, the output of the logic gate being connected to an input-output contact pin of the microcircuit.

These characteristics and advantages as well as others of the present invention will be described with more details in the non limitative following description of a mutual authentication method according to the invention, of a microcircuit structure allowing the method to be carried out and of a method of verifying the secret code of a smart card user according to the invention, in conjunction with the accompanying drawings in which:

FIG. 1, previously described, shows the block diagram of a conventional microcircuit for smart cards, FIG. 2 shows the block diagram of a microcircuit according to the invention, and FIG. 3 shows a logic diagram of a block of FIG. 2.

Mutual authentication method between a microcircuit and a terminal.

BRIEF DESCRIPTION OF THE DRAWINGS

It is recalled that a purpose of the present invention is to prevent multiple interrogations of a smart card microcircuit or equivalent.

DESCRIPTION OF THE PREFERRED EMBODIMENTS

Figure 1:
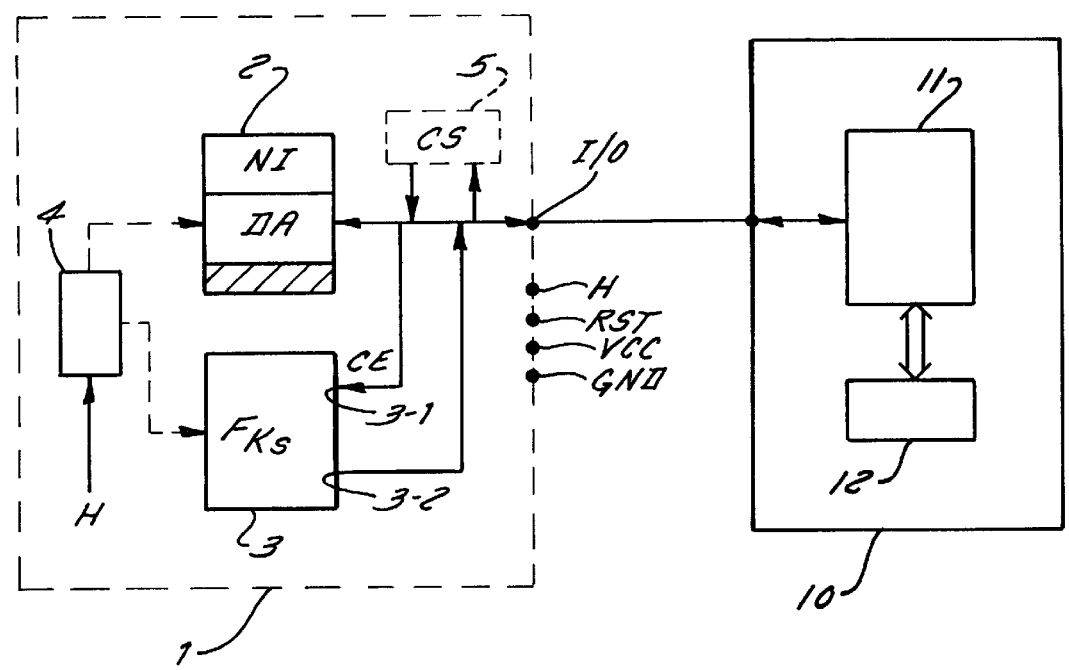

According to the invention, the microcircuit (50) further comprises a generator 54 for generating random binary words, a serial logic comparator 55 with two inputs E1, E2, three logic switching units 56, 57, 58, a logic switch 59 and a logic AND gate 60. The random generator 54 is for example a shift register whose working is made random in a conventional way by the fact that internal bits of said register are fed back to its input by means of an EXCLUSIVE OR gate. The logic switching unit 56 is a switching unit with three positions and is provided with three input pins P1, P2, P4 and an output pin PS. The switching unit 57 is a switching unit with four positions and is provided with four input pins P2, P3, P4, P5 and an output pin PS. The switching unit 58 is a switching unit with two positions and is provided with two input pins P3, P5 and an output pin PS. Lastly the switch 59 is provided with an input pin P1 and an output pin PS.

The output of the memory 51 is connected to the contact pins P1 of the switching unit 56 and of the switch 59, the output of the random generator 54 is connected to the contact pins P2 of the switching units 56 and 57 and the output of the authentication circuit 52 connected to the contact pin P3 of the switching unit 58. The inputs E1, E2 of the comparator 55 are connected to the contact pins P3 of the switching units 57 and 58, the inputs of the AND gate 60 are connected to the contact pin P5 of the switching unit 58 and to the output of the comparator 55. The output of the AND gate 60 is connected to the contact pin P5 of the switching unit 57 whose contact pin PS is connected to the input-output contact pin I/O of the microcircuit 50. Lastly, the contact pin PS of the switching unit 56 is connected to the input of the authentication circuit 52, the contact pins P4 of the switching units 56 and 57 are connected together and the contact pin PS of the switch 59 is connected to the contact pin P2 of the switching unit 57.

According to the invention, the sequential logic circuit 53 is wired such that an authentication procedure of a terminal, for example the terminal 10 of FIG. 1, is performed by the microcircuit 50 from the beginning of the reception of the first clock pulses which follow the insertion of the card into the terminal 10. Of course, this authentication procedure does not involve a modification of the structure of the terminal 10, which must simply be programmed to respond to the microcircuit (50) as described now:

Authentication of the Terminal

Step 1: the switching unit 56 and the switch 59 are set in the position P1/PS and the switching unit 57 in the position P2/PS. The data NI and DA of the memory 51 are serially sent to the authentication circuit 52 and to the contact I/O.

Step 2: the switch 59 is open, the switching units 56 and 57 are set in the position P2/PS. The random generator 54 generates a random code ALINT (a random series of "1" and of "0"), which is applied to the authentication circuit 52 and to the contact pin I/O.

Step 3: the switching units 57 and 58 are set in the position P3/PS. The authentication circuit 52 produces a serial code CA of the form $$CA=F_{Ks}(NI, DA, ALINT)$$

NI, DA and ALINT being the linked data forming the input code CE from which the authentication code CA is generated. While being produced, the code CA is applied to the input E1 of the serial logic comparator 55. At the same time, that is in synchronism, the input E2 of the comparator 55 receives a serial code CA' sent by the terminal 10 by means of the contact pin I/O and the switching unit 57.

For security reasons, the injection of NI and DA as components of the input code CE allows the setting of the authentication circuit 52 to an internal logic state as far as possible from its logic state "zero", i.e. the logic state after the reset to zero of the circuits that it comprises.

The step 4 hereafter starts when the two serial codes CA and CA' have been injected into the comparator 55. At this instant, the output of the comparator 55 is a "1" if the two codes were identical and a "0" if the two codes were different.

Authentication of the Card

Step 4: the switching units 56 and 57 are set in the position P4/PS, the input of the authentication circuit 52 being thus connected to the input-output pin I/O. A conventional procedure, which is known per se, begins for authenticating the card. Because this procedure has been preceded by the steps 1 to 3 according to the invention, it can consist in several alternatives, depending on the fact that the authentication circuit 52 is reset to zero or left in the internal logic state that it had at the end of step 3.

(a) If the circuit 52 is reset to zero, it can be provided that the terminal 10, which has already read the data NI and DA in step 1, sends back NI and DA to the authentication circuit 52 together with a random code ALEXT produced by itself.

(b) If the authentication circuit 52 is not reset to zero, the terminal sends the random code ALEXT only, it is no more necessary to send back the data NI and DA to the authentication circuit 52 which has already received them in step 1.

Step 5: it is supposed now that case (a) here above has been chosen. The switching units 57 and 58 are in the position P5/PS. The output of the authentication circuit is coupled to the input-output contact pin I/O by means of the AND gate 60 and supplies an authentication code CA to the terminal 10 of the form:

$$CA=F_{Ks}(NI, DA, ALEXT)$$

which will allow the terminal 10 to check the authenticity of the card.

However, if the output of the comparator 55 has been set to "0" during step 3, the AND gate will not be in its passing state and the code CA provided by the authentication circuit 52 will not reach the terminal 10 which is considered as non authentic. As a matter of fact the terminal 10, which has received the parameters NI, DA and ALINT from the microcircuit 50 in steps 1 and 2, should have been able to provide a code CA' identical to the code CA in step 3.

The present invention shows thus that the card emits an authentication code only if it has itself first authenticated the terminal interrogating it. No repeated card interrogation by a non authorised person will thus be done.

Figure 3:
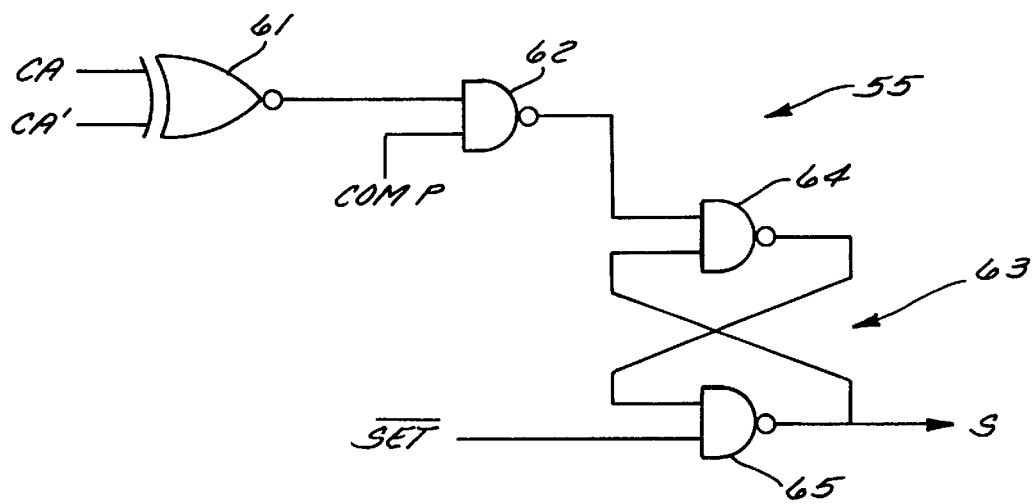

As an example, FIG. 3 shows an embodiment of the serial comparator 55. The input of the comparator 55 comprises an EXCLUSIVE OR gate 61 receiving the codes CA and CA'. The output of the gate 61 is applied to the input of a NOR gate 62 whose other input receives a signal COMP. The output of the gate 62 is applied to a first input of a memory flip-flop 63 of the NOR type conventionally comprising two NOR gates 64, 65, whose outputs are reciprocally fed back to the inputs. The other input of the memory flip-flop 63 receives a signal /SET for resetting to 1 its output. The output of the flip-flop 63 forms the output of the comparator 55.

Before step 3, the signal /SET is set to 0 during a short period of time to ensure that the output of the comparator 55 is at 1. In step 3, when CA is compared with CA', the signal COMP is set to 1. If during step 3 the codes CA and CA' present two bits or more which are different, the output of the comparator 55 switches to 0 and remains definitively at 0, so that the AND gate will be blocked in the following steps. To reset the output of the comparator to 1 (/SET set to 0), it will be necessary to reset to 0 the sequential logic circuit 53 and repeat the steps 1, 2 and 3 already described, such that an authentication code CA sent by the card will never be read through the contact pin I/O as long as the interrogating entity has not been first authorised by the card.

Of course other total or partial blocking means of the microcircuit 50 can be provided by the man skilled in the art for preventing the card to emit an authentication code when the terminal has not been first authorised. However, the preferred solution of the invention, which consists in blocking the output of the authentication circuit 52, has the advantage of being particularly simple to implement and do not require the intervention of the wired sequential logic circuit 53.

Method of Checking the Validity of a Secret Code Held by a User

As described in the preamble in conjunction with FIG. 1, the fact to propose an identification method of the user of a smart card by means of a secret code CS make necessary in the prior art to provide costly and bulky comparison means 5 in a wired-logic microcircuit 1.

The present invention proposes a particularly simple solution which offers a great security and can be carried out only with a modification of the wired logic of the sequential circuit of the microcircuit without a modification of its general structure.

More precisely, and referring for example to FIG. 1, the present invention first proposes to locate the secret code CS of the card into an area of the memory 2 which is non readable by the terminal, shown by a hatched zone.

Then, the present invention provides to link the secret code CS with the other data forming the input code CE, such that the authentication code CA depends on the secret code CS.

Generally, the method of checking the secret user code CS' can be performed according to the present invention:

(1) either during the conventional procedure of authentication of the card by the terminal 10, (2) or during the authentication procedure of the terminal 10 by the card, as described here above.

(1) Verification of the Secret Code CS' During the Conventional Procedure of Card Authentication by the Terminal In this case, and referring for example to FIG. 1, the input code CE injected into the authentication circuit 3 comprises:

the memory data, here the serial number NI and transaction data DA, the secret code CS of the card, read out of the memory 2 (hatched area) and sent directly to the authentication circuit (the hatched area containing CS being of course readable by the microcircuit 1 but not by the terminal 10), the random word ALEXT sent by the terminal 10.

The authentication code sent by the card can be written:

$$CA=F_{Ks}(NI, DA, CS, ALEXT),$$

and the code calculated by the terminal 10 can be written:

$$CA'=F_{Ks}(NI, DA, CS', ALEXT)$$

CS' being the secret code transferred by the user to the terminal 10.

The comparison of the two codes CA and CA' is performed by the terminal 10. If the terminal notices that the two codes are different, it may be because the code CS' provided by the user is wrong or because the card is falsified. It is not necessary for the terminal to determine the actual reason, it is sufficient that it stops the transaction. Possibly the terminal may ask the user to re-enter the secret code CS' and repeat the authentication procedure.

Figure 2:
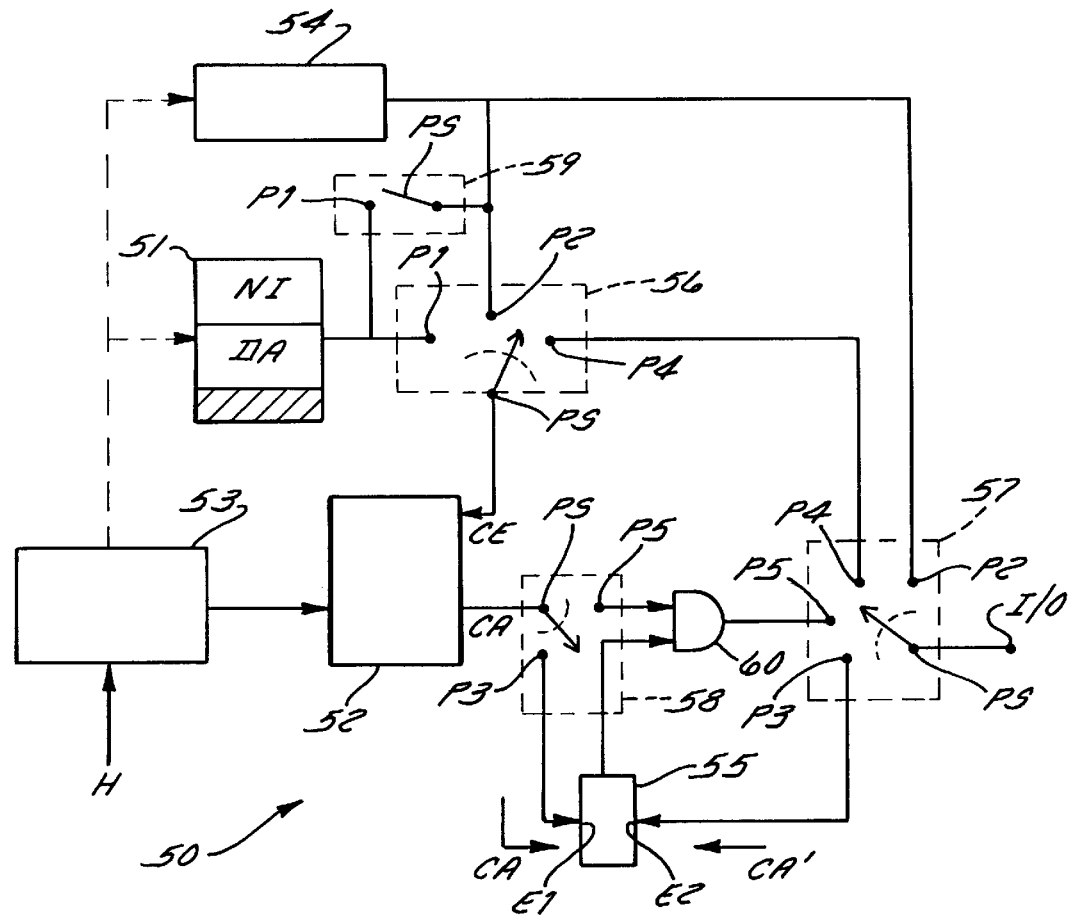
FIG. 2 shows the diagram of a wired-logic microcircuit 50 of a smart card able to resist to multiple requests. The microcircuit 50 comprises a data memory 51 which is serially read (that is bit by bit) and comprises for example the serial number NI of the card and transaction data DA, as the conventional microcircuit already described in conjunction with FIG. 1. An authentication circuit 52, a sequential logic circuit 53 for controlling the various elements of the circuit 50 and an input-output pin I/O are present as well.

(2) Verification of the Secret Code CS' During the Authentication Procedure of the Terminal by the Card The authentication procedure of the terminal 10 by the card has already been described in conjunction with FIG. 2, reference to which is now made again.

In this case the input code CE injected in the authentication circuit 52 comprises:

the memory data, here the serial number NI and the transaction data DA, the secret code CS of the card sent directly to the authentication circuit 52 from the memory 2 (hatched area), the random word ALINT produced by the random generator 54 of the microcircuit 50.

The authentication code CA supplied by the authentication circuit 52 to the input E1 of the logic comparator 55 reads then as follows:

$$CA=F_{Ks}(NI, DA, CS, ALINT),$$

and the code calculated by the terminal 10, applied to the input E2 of the logic comparator 55, reads as follows:

$$CA'=F_{Ks}(NI, DA, CS', ALINT)$$

CS' being the secret code provided by the user to the terminal 10.

The comparison of the two codes CA and CA' is performed by the comparator 55. If the two codes are different, the comparator switches to 0 and the logic gate 60 will be blocked when the terminal 10 tries to check the authenticity of the card. The terminal 10 will know that the code CS' was wrong when it receives no answer from the card after having interrogated it.

Of course numerous other alternatives of this method can be provided by the man skilled in the art. In particular, it can be provided a similar procedure as the one described at point (1) wherein the ALEXT code is replaced by an ALINT code produced by the card, or a procedure as the one described at point (2) wherein the ALINT code would be replaced by an ALEXT code sent out by the terminal.

Lastly, it can be provided that the memory area containing the secret code becomes writable when the user has been authorised (preferably, it is always prevented from being read for security reasons). Indeed the user, after having been authorised, may wish to write a new secret code into the card. However, it is obvious that, still for security reasons, the memory area containing the secret code must not be able to be written into as long as the user has not been authorised with the previous secret code.

For the sake of simplicity, the logic mechanisms allowing a memory area to be permanently or temporary readable and/or writable are not described in the present patent application, as they form part of the general knowledge of the man skilled in the art and are based on a logic control of the address values of the considered memory area.

Although the term "smart memory" has been used in the foregoing, it is of course obvious that the present invention is not only intended to an application in the field of plastic cards, but relates generally to every portable support suitable for receiving a chip.

Generally, the present invention relates to any product using a wired-logic microcircuit whose authenticity has to be verified, like contactless electronic tags (operating by means of electromagnetic signals), electronic keys (with or without contact), electronic cards for the identification of persons, etc.

What is claimed is:

1. A wired-logic microcircuit mounted on a portable support comprising:
   (A) an authentication circuit with serial input and serial output, arranged to produce an authentication code from an input code,
   (B) a memory, the memory comprising data readable by a terminal and the memory comprising a secret code of the microcircuit located in an area of the memory that is non readable by the terminal,
   (C) means for generating a random code,
   (D) means for sending to the authentication circuit the random code, the data of the memory, and the secret code in a linked form, to produce an internal authentication code,
   (E) means for comparing the internal authentication code with an external authentication code sent by a terminal, the external authentication code having been produced from an input code that includes the data of the memory of the microcircuit which can be read by the terminal, a second secret code transferred to the terminal by a user of the microcircuit, and said random code,
   (F) means for provoking at least a partial blocking of the internal functioning of the microcircuit if the external authentication code is different from the internal authentication code, wherein said blocking means comprise a logic gate receiving at its first input the output of a comparator circuit and at its second input the output of the authentication circuit, the output of the logic gate being connected to an input-output contact pin of the microcircuit.

2. A wired-logic microcircuit mounted on a portable support comprising:
   (A) an authentication circuit with serial input and serial output, arranged to produce an authentication code from an input code,
   (B) a memory, the memory comprising data readable by a terminal, and the memory comprising a secret code of the microcircuit located in an area of the memory that is non readable by the terminal,
   (C) a random code generator that generates a random code,
   (D) a sequential logic circuit, the sequential logic circuit causing the random code, the data of the memory, and the secret code to be sent to the authentication circuit in a linked form, to produce an internal authentication code,
   (E) a comparator, the comparator comparing the internal authentication code with an external authentication code sent by a terminal, the external authentication code having been produced from input code that includes the data of the memory of the microcircuit which can be read by the terminal, a second secret code transferred to the terminal by a user of the microcircuit, and said random code, and
   (F) a logic circuit that is coupled to the output of the comparator and that provokes at least a partial blocking of the internal functioning of the microcircuit if the external authentication code is different from the internal authentication code.

3. A microcircuit according to claim 2, further comprising a logic circuit that is coupled to the output of the comparator and that provokes at least a partial blocking of the internal functioning of the microcircuit if the external authentication code is different from the internal authentication code.

4. An authentication method for a wired logic microcircuit mounted on a portable support and a terminal intended to read the microcircuit, the method comprising:
   (A) providing the wired-logic microcircuit, the wired-logic microcircuit including
      (1) a sequential logic circuit,
      (2) a wired-logic authentication circuit coupled to the sequential logic circuit such that the wired-logic authentication circuit is controllable by the sequential logic circuit, the wired-logic authentication circuit further comprising a serial input and a serial output,
      (3) a memory coupled to the sequential logic circuit such that the memory is controllable by the sequential logic circuit, the memory comprising data which can be read by the terminal, and
      (4) a switch that has a first input coupled to receive a random code and a second input coupled to the memory,
   (B) producing a first authentication code by the wired-logic microcircuit, including
      (1) controlling the memory using the sequential logic circuit, the controlling step including causing the memory to retrieve data that is stored in the memory, and causing the memory to retrieve a first secret code that is stored in the memory, the first secret code being located in an area of the memory that is non readable by the terminal,
      (2) controlling the switch using the sequential logic circuit, including causing the switch to produce a first input code for the authentication circuit by coupling the authentication circuit to receive the data in the memory, the first secret code, and the random code,
      (3) controlling the authentication circuit using the sequential logic circuit, including causing the authentication circuit to produce the first authentication code based on the first input code,
   (B) producing a second authentication code by the terminal from a second input code, the input code including the data of the memory of the microcircuit which can be read by the terminal, a second secret code transferred to the terminal by a user of the microcircuit, and said random code; and
   (C) comparing the first authentication code produced by the microcircuit and the second authentication code produced by the terminal.

5. A method according to claim 4, wherein said random code is generated by the terminal.

6. A method according to claim 4, wherein said random code is generated by the microcircuit.

7. A method according to claim 4, wherein the comparing step is performed by the terminal.

8. A method according to claim 4, wherein the comparing step is performed by the microcircuit.

9. A method according to claim 8, further comprising preventing the transmission of digital data between the output of the authentication means of the microcircuit and the terminal when the first authentication code and the second authentication code are different.

10. A method according to claim 4, wherein said first secret code is located in an area of the memory made accessible for being written into by the terminal after that the validity of the second secret code has been checked.

11. An authentication method for a wired logic microcircuit mounted on a portable support and a terminal intended to read the microcircuit, the microcircuit being provided with a switch that has a first input coupled to receive a random code and a second input coupled to the memory and memory comprising data which can be read by the terminal, the terminal and the microcircuit being provided with authentication means to produce an authentication code from an input code means of the microcircuit comprising a wired-logic authentication circuit with serial input and output, the method comprising:

(A) producing a first authentication code by the wired logic microcircuit, including applying linked data to the input of the authentication circuit, the linked data including the data of the memory which can be read by the terminal, a first secret code of the microcircuit and a random code;

(B) producing a second authentication code by the terminal from an input code, the input code including the data of the memory of the microcircuit which can be read by the terminal, a second secret code transferred to the terminal by a user of the microcircuit, and the random code; and (C) comparing the first authentication code produced by the microcircuit and the second authentication code produced by the terminal; and wherein the first secret code is located in an area of the memory that is non-readable by the terminal.

12. A method according to claim 11, wherein the random code is generated by the terminal.

13. A method according to claim 11, wherein the random code is generated by the microcircuit.

14. A method according to claim 11, wherein the comparing step is performed by the terminal.

15. A method according to claim 11, wherein the comparing step is performed by the microcircuit.

16. A method according to claim 15, further comprising preventing the transmission of digital data between the output of the authentication means of the microcircuit and the terminal when the first authentication code and the second authentication code are different.

17. A method according to claim 11, wherein the first secret code is located in an area of the memory made accessible for being written into by the terminal after the validity of the second secret code has been checked.

18. A method according to claim 11, wherein the data of the memory which can be read by the terminal includes transaction data and a serial number of the microcircuit.

19. A wired-logic microcircuit mounted on a portable support comprising:

(A) an authentication circuit with serial input and serial output, arranged to produce an authentication code from an input code;

(B) a memory, the memory including data readable by a terminal and a secret code of the microcircuit located in an area of the memory that is non-readable by the terminal;

(C) means for generating a random code;

(D) means for sending to the authentication circuit the random code, the data of the memory, and the secret code in a linked form, to produce an internal authentication code;

(E) means for comparing the internal authentication code with an external authentication code sent by a terminal, the external authentication code having been produced from an input code that includes the data of the memory of the microcircuit which can be read by the terminal, a second secret code transferred to the terminal by a user of the microcircuit, and the random code; and (F) means for provoking at least a partial blocking of the internal functioning of the microcircuit if the external authentication code is different from the internal authentication code;

(G) wherein said blocking means comprise a logic gate receiving at its first input the output of a comparator circuit and at its second input the output of the authentication circuit, the output of the logic gate being connected to an input-output contact pin of the microcircuit.

20. A microcircuit according to claim 19, wherein the blocking means are arranged to prevent the transmission of digital data from the output of the authentication circuit to the outside of the microcircuit.

21. A wired-logic microcircuit mounted on a portable support comprising:

(A) an authentication circuit with serial input and serial output, arranged to produce an authentication code from an input code;

(B) a memory, the memory comprising data readable by a terminal and a secret code of the microcircuit located in an area of the memory that is non-readable by the terminal;

(C) a random code generator that generates a random code;

(D) a sequential logic circuit, the sequential logic circuit causing the random code, the data of the memory, and the secret code to be sent to the authentication circuit in a linked form, to produce an internal authentication code;

(E) a comparator, the comparator comparing the internal authentication code with an external authentication code sent by a terminal, the external authentication code having been produced from input code that includes the data of the memory of the microcircuit which can be read by the terminal, a second secret code transferred to the terminal by a user of the microcircuit, and the random code; and (F) a logic circuit that is coupled to the output of the comparator and that provokes at least a partial blocking of the internal functioning of the microcircuit if the external authentication code is different from the internal authentication code.

* * * * *